(12) United States Patent
Tai et al.

(10) Patent No.: US 6,490,060 B1
(45) Date of Patent: Dec. 3, 2002

(54) LIGHTWEIGHT HOLOGRAPHIC SIGHT

(75) Inventors: Anthony M. Tai, Northville, MI (US); Eric J. Sieczka, Saline, MI (US)

(73) Assignee: EOTech, Inc., Ann Arbor, MI (US)

( * ) Notice: Subject to any disclaimer, the term of this patent is extended or adjusted under 35 U.S.C. 154(b) by 16 days.

(21) Appl. No.: 09/687,624

(22) Filed: Oct. 13, 2000

Related U.S. Application Data

(60) Provisional application No. 60/159,312, filed on Oct. 14, 1999.

(51) Int. Cl.[7] .................................................. G02B 5/32
(52) U.S. Cl. ............................. 359/15; 359/1; 33/233; 33/241
(58) Field of Search ................................ 359/15, 19, 1, 359/16; 356/247

(56) References Cited

U.S. PATENT DOCUMENTS

| | | |
|---|---|---|
| 4,643,515 A | 2/1987 | Upatnieks |
| 5,151,800 A | 9/1992 | Upatnieks |
| 5,483,362 A | 1/1996 | Tai et al. |
| 5,815,936 A | 10/1998 | Sieczka |

*Primary Examiner*—Cassandra Spyrou
*Assistant Examiner*—Leo Boutsikaris
(74) *Attorney, Agent, or Firm*—Brooks & Kushman P.C.

(57) ABSTRACT

A lightweight contact holographic sight includes a housing and a base which form a compartment containing a laser diode, an associated power source, and optical elements including a mirror, an off axis collimator, a reflection grating, and an image hologram of a reticle pattern, wherein the optical elements are arranged within the compartment to direct and fold the laser beam in a substantially generally vertical path. In one aspect of the invention, an elevation and windage adjustment mechanism is provided to rotate the reflection grating about two orthogonal axes to thereby adjust the projected reticle pattern for windage and elevation. In another aspect of the invention a removable battery compartment including a cam surface which is releasably contacted by a cam lever arm pivotally mounted on the sight housing or the base to allow for quick tool-less removal of the compartment for battery replacement.

11 Claims, 7 Drawing Sheets

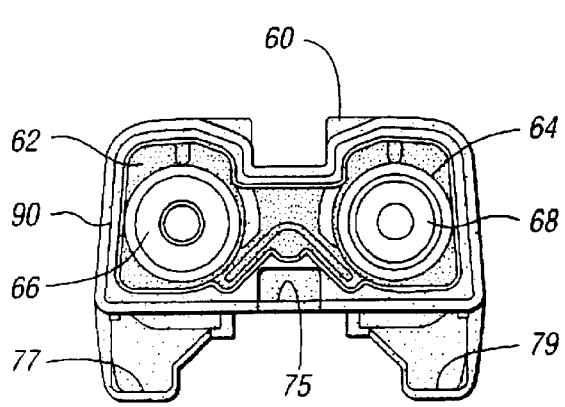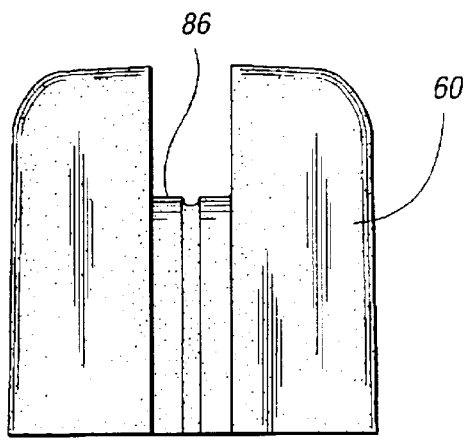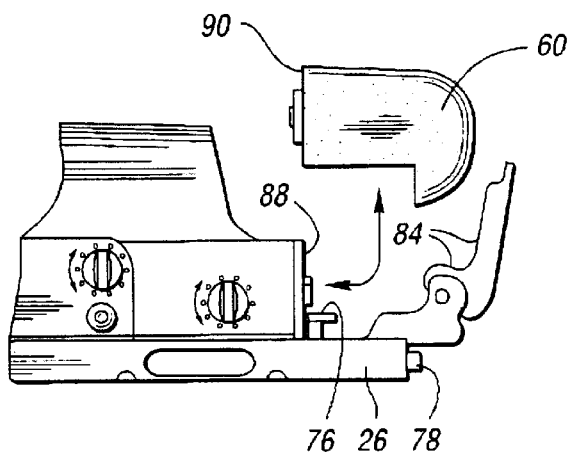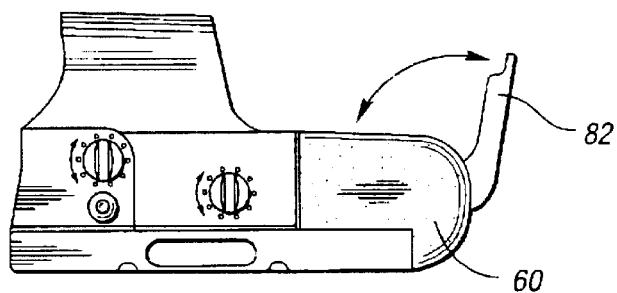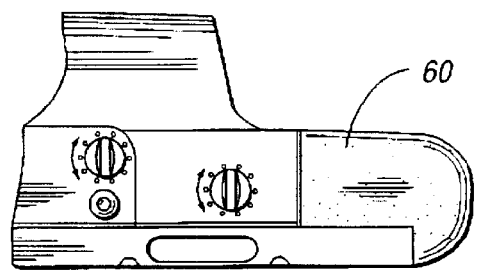

LIGHTWEIGHT HOLOGRAPHIC SIGHT

CROSS-REFERENCE TO RELATED APPLICATIONS

This application claims the benefit of U.S. provisional application Ser. No. 60/159,312 filed Oct. 14, 1999.

TECHNICAL FIELD

This invention relates to a design for a lightweight holographic sighting device for use on firearms and bows.

BACKGROUND ART

There are several types of sights utilized with small arms, such as rifles, shotguns, hand guns, bows, and other similar, hand-held weapons, including sights which incorporate holographic images of various one, two and dimensional reticle patterns.

The Compact Holographic Sight disclosed in U.S. Pat. No. 5,483,362 issued to Tai et al describes the design of a holographic sight that is relatively compact. It is currently sold in the commercial market as the Bushnell® HOLOsight®. Other HOLOsight® features are disclosed in U.S. Pat. No. 5,815,936 issued to Sieczka et al. The HOLOsight® is ideal for larger weapons such as rifles or shotguns and works well with larger caliber handguns. This sight, however, is too long and too heavy for some smaller handguns and some bows.

A number of compact hologram displays have been developed, including the edge illuminated holograms disclosed in U.S. Pat. Nos. 4,643,515 and 5,151,800, both also issued to Upatnieks. These hologram displays have a compact, monolithic structure. They also utilize a diffraction or reflection grating to minimize the effects of the wavelength drift of the laser diode light beam. These edge illuminated, monolithic displays however, have not been incorporated into sights because they are relatively expensive to manufacture.

It is thus desirable to reduce the weight and length of the holographic sight to make it practical as a sighting device for weapons of all types and sizes. It is also desirable to produce a design that can be manufactured at a lower cost.

DISCLOSURE OF INVENTION

It is therefore an object of the present invention to provide a holographic sight that is short enough in length and light enough in weight to be conveniently used on relatively small handguns and bows.

It is yet another object of the present invention that the sight can be manufactured at a lower cost.

It is yet another object of the present invention to provide a holographic sight including a windage end elevation adjustment mechanism which is stable and precise, yet simple, lightweight, and economical in design.

It is yet another object of the present invention to provide a collimator for a holographic sight which is simple in design, and economical to manufacture.

It is yet another object of the present invention to provide a battery powered sight which allows for quick and easy replacement of the batteries in the field.

In carrying out the above and other objectives, the lightweight holographic sight of the present invention includes a housing and a base which form a compartment containing a laser diode, an associated power source, and optical elements including a mirror, an off-axis collimator, a holographic reflection grating, and an image hologram of the reticle pattern, wherein the optical elements are arranged within the compartment to direct and fold the laser beam in a substantially generally vertical path.

The invention also preferably includes an elevation and windage adjustment mechanism which rotates the reflection grating about generally horizontal and vertical axes to thereby adjust the projected reticle pattern, and a removable battery compartment including a cam surface which is releasably contacted by a cam lever arm pivotally mounted on the housing or the base to allow for tool-less removal of the compartment for battery replacement.

The sight of the present invention is relatively more compact in its length, due to the above described arrangement of the optical elements. The vertically folded light path significantly shortens the sight, which in turn reduces the length of the metallic base and decreases the weight of the unit.

The diverging beam from the laser is collimated by an off-axis reflective collimator which is lighter than an equivalent collimating lens, and diffracted by a reflection grating. The diffracted light illuminates the reticle image hologram to form the holographic aiming reticle.

The base of the present invention also preferably includes a mounting mechanism that quickly and securely mounts the sight onto any standard Weaver® style scope rail.

As taught in U.S. Pat. No. 5,483,362, the emission wavelength of a laser diode changes with temperature, and the angle of diffraction is a function of wavelength. By simply illuminating a reticle image hologram with a laser diode, the angular position of the reconstructed image will not be stable. The reticle position will shift with a change in the case temperature of the laser diode. To produce a stable reticle image over a wide temperature range, the illuminating beam is diffracted first by a grating. The wavelength dependency can be removed by matching the dispersions of the grating and the reticle hologram. In the sight described in U.S. Pat. No. 5,483,362, a transmission grating bonded onto a prism is used to produce a dispersion equal to, but with the opposite sign of, the dispersion of the image hologram. In a preferred embodiment of the present invention, a reflection grating is used to compensate for the wavelength dependency of the diffraction by the image hologram. The reflection grating is lighter and more compact than the prism/transmission grating combination described in U.S. Pat. No. 5,483,362.

U.S. Pat. Nos. 5,483,362 and 5,815,936 teach that the angular position of the reconstructed reticle image may be changed for elevation and windage adjustments by rotating the image hologram while keeping the illuminating beam stationary. The adjustment mechanism disclosed in these patents is located behind the hologram, which adds to the overall length of the sight. It is made of aluminum to provide the strength needed to hold the image hologram and its metallic frame in place during recoil.

In the preferred embodiment of the present invention, the angular position of the reticle imaged is changed by rotating the reflection grating. The grating is smaller and lighter than the image hologram and is located inside the housing of the sight. Since the grating is not exposed, it does not have to be protected by its own special frame. This allows the elevation and windage mechanism to be made of a molded composite material, such as plastic, instead of metal, which reduces the production cost. The entire adjustment mechanism is located inside the housing, thereby protecting the mechanism from dirt. Moreover, a sight including this reflection grating adjustment mechanism can be shorter in length, which reduces the overall weight of the sight.

In the preferred embodiment, the batteries are placed inside a battery compartment which is then locked securely in place withing the housing via a cam lever.

A parabolic reflector is the ideal collimator but the aspheric surface is costly to produce. To minimize production costs, one embodiment of the present invention includes an off-axis collimator having two spherical surfaces of different radii. The collimator is preferably made of glass. The light passes through the glass, is reflected off the mirrored back surface of the optical element and through the glass again. The curvatures are chosen such that the spherical aberration is minimized.

As taught in U.S. Pat. No. 5,483,362, the brightness of the reticle image may be controlled by the average output power of a pulse width modulated laser diode. Lowering the duty cycle dims the reticle image. The dynamic range of the brightness control is limited by the narrowest pulse width that can be implemented. The disclosure of U.S. Pat. No. 5,483,362 relating to controlling the brightness of the reticle image with pulse width modulation is incorporated by reference herein.

Most mounts that attach an optical scope onto a Weaver® style rail on a gun use two bolts to tighten the clamps on either two physically separated mounting bases or an integrated mounting base. Because the present invention is significantly smaller than existing holographic sights in both the length and the weight, the mounting mechanism in the preferred embodiment has a single mounting bolt. The use of a single bolt speeds up the mounting and dismounting of the holographic sight. Moreover, the single bolt mount provides better repeatability than the traditional two-bolt mount which is sensitive to the relative tightening torques applied to the two bolts.

The above objects and other objects, features and advantages of the present invention are readily apparent from the following detailed description of the best mode for carrying out the invention when taken in connection with the accompanying drawings.

BRIEF DESCRIPTION OF DRAWINGS

FIG. 11 is an end view of the battery compartment;

FIG. 12 is a top view of the battery compartment;

FIGS. 13a–c are three side views of the sight illustrating the battery compartment and cam lever arm locking assembly in three states of installation;

BEST MODE FOR CARRYING OUT THE INVENTION

Figure 1:
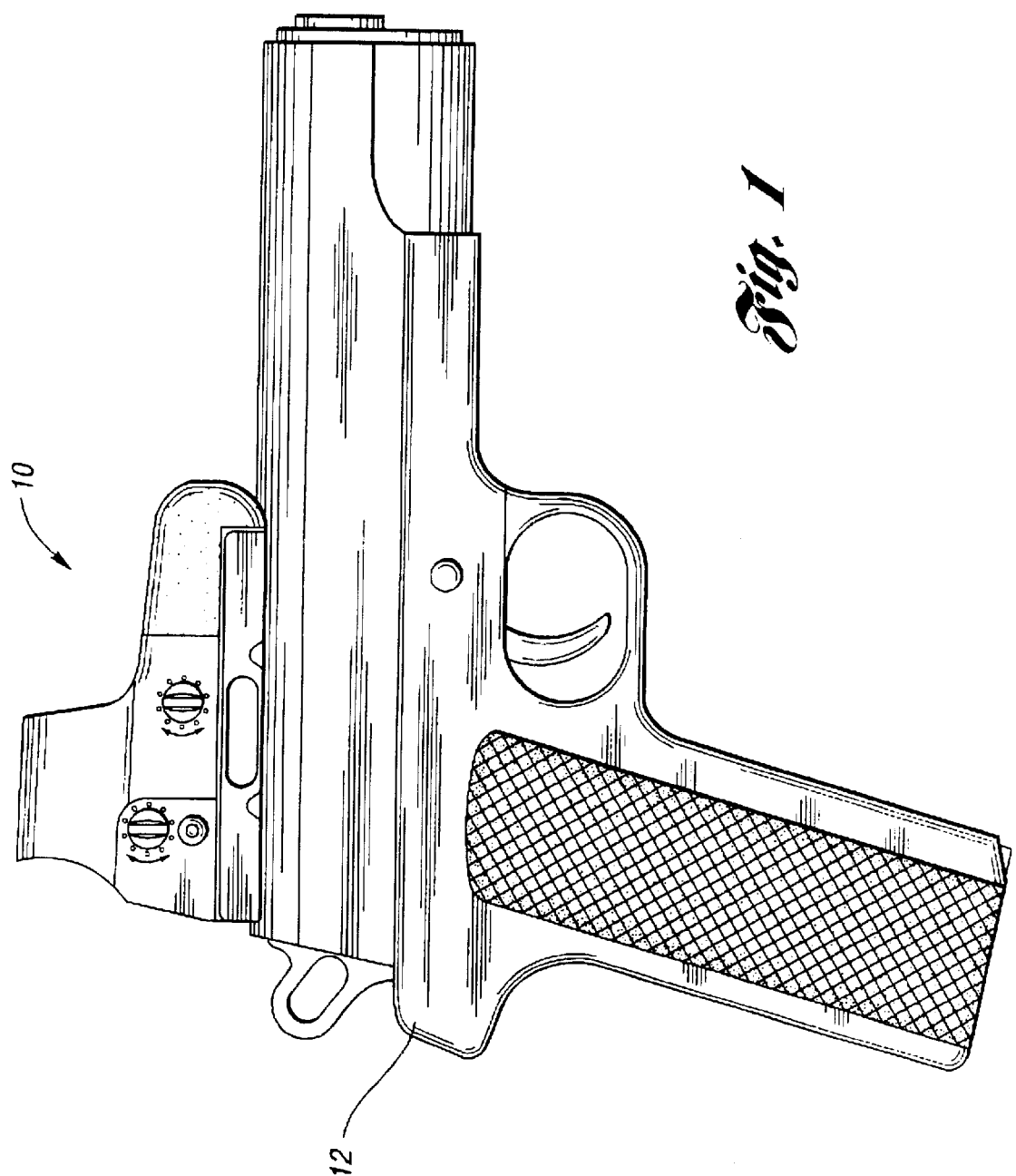
FIG. 1 is a plan perspective view of a holographic sight of the present invention mounted on a handgun.

Referring to FIG. 1, one embodiment of the lightweight holographic sight of the present invention, generally indicated by 10, is shown mounted on a handgun 12, though it will be appreciated that the sight 10 may be similarly mounted for use on other arms, including, for example, bows, and is particularly suited for mounting and use with small arms due to its compact lightweight design.

Figure 2:
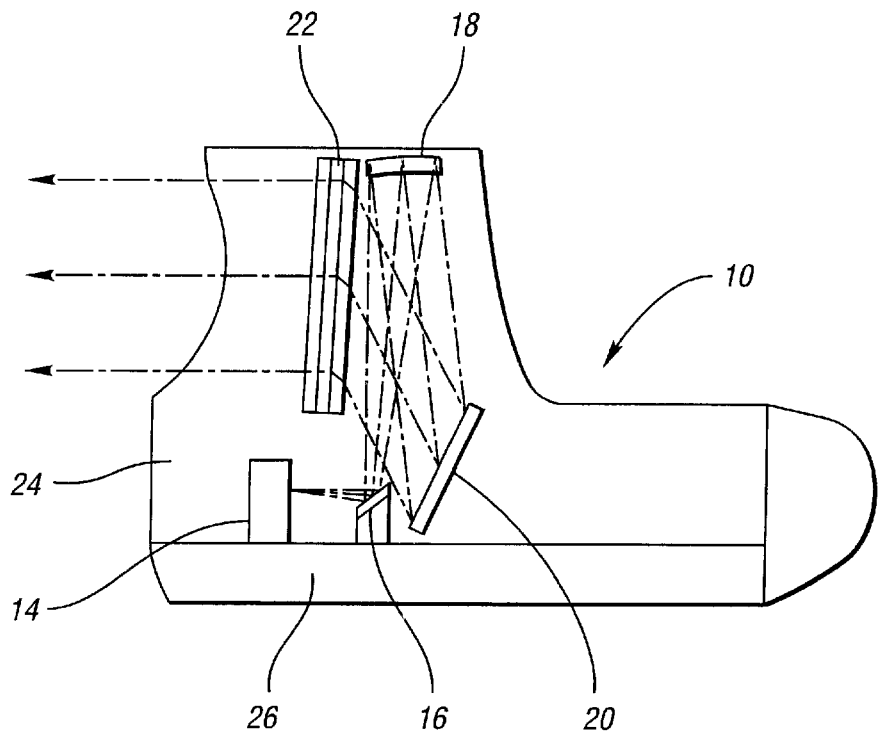
FIG. 2 is a schematic side view of the holographic sight of the present invention illustrating the layout of the optical components.

Referring to FIG. 2, the illustrated embodiment of the sight 10 includes a laser diode 14, a folding mirror 16, a collimator 18, a holographic grating 20, and a hologram 22, each securely mounted within a housing 24 upon a base 26. In one embodiment, the housing 24 and base 26 are aluminum, although these components may alternatively be manufactured from other resilient, impact-resistant materials, such as plastic.

Figure 3:
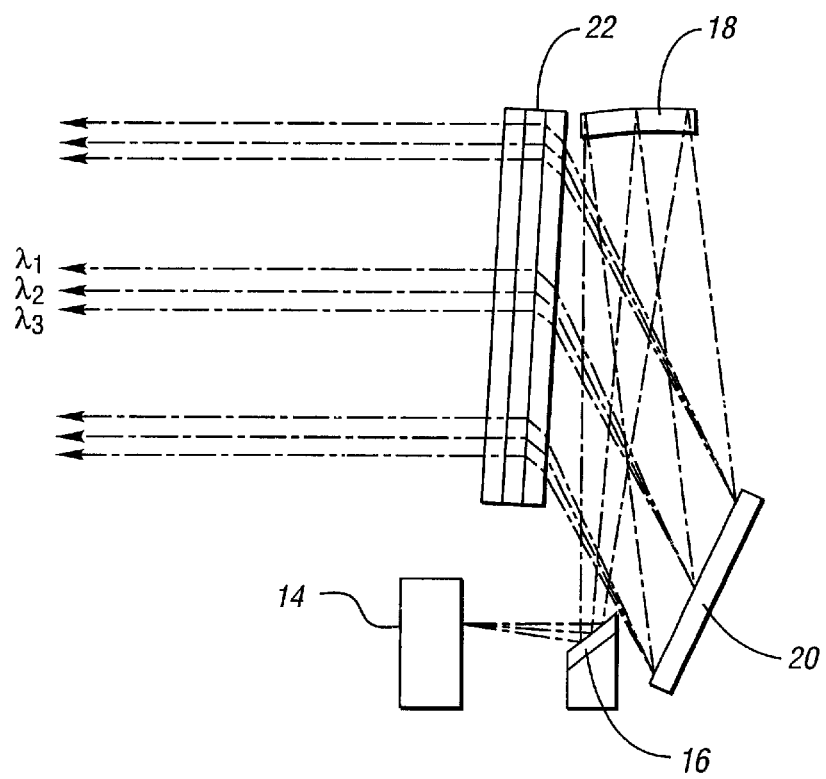
FIG. 3 illustrates the different optical paths resulting from different laser diode emission wavelengths.

FIGS. 2 and 3 illustrate the optical layout of the lightweight holographic sight 10 in accordance with one aspect of the present invention. The optical path is folded and the light propagation is primarily in the vertical direction. The diverging laser beam from a laser diode 14 is reflected generally upward by the folding mirror 16 towards the off-axis reflective collimator 18. The beam becomes collimated after it is reflected off the collimator 18 and directed generally downward towards the reflective diffraction grating 20. The grating 20 diffracts the laser light generally upward to the hologram 22, which has been recorded with a the projected image of a reticle pattern. It should be noted that terms "vertical", "horizontal", "upward", and "downward", are used herein to describe locations and direction based upon an assumption that the holographic sight is mounted for use where the longitudinal axis of the base 26 and the path of the reticle pattern extend in a horizontal direction. Thus, while it is described that the optical path is folded such that the light propagation is primarily in the vertical direction, it will be understood that, regardless of the orientation of the sight, that portion of the path referred herein as "vertical" will always be substantially perpendicular to the longitudinal axis of the base, and similarly, substantially perpendicular to the path of the projected image of the reticle pattern.

It will be appreciated that utilization of this aspect of the present invention to orient the folded light path in the manner shown in FIGS. 2 and 3 allows for the sight to be relatively shorter in length which reduces the length of the base and, thereby, decreases the overall weight of the sight.

The emission wavelength of the laser diode 14 changes with temperature at rate of 0.25 nm/° C. Over a temperature range 40° C., the emission wavelength can change by 10 nm. By matching the dispersion of the grating 20 and the image hologram 22, the output diffraction angle remains constant even when the emission wavelength of the laser diode drifts with temperature as illustrated in FIG. 3. In one embodiment, for example, the angles of the beams used to record the reflection grating are 57° and 37.4° respectively. At the nominal wavelength of 650 nm, the dispersion of the resulting grating is identical to but at the opposite direction of the reticle image hologram which is recorded with an object beam angle of 2.5° and an reference beam angle of 60°.

Figure 4:
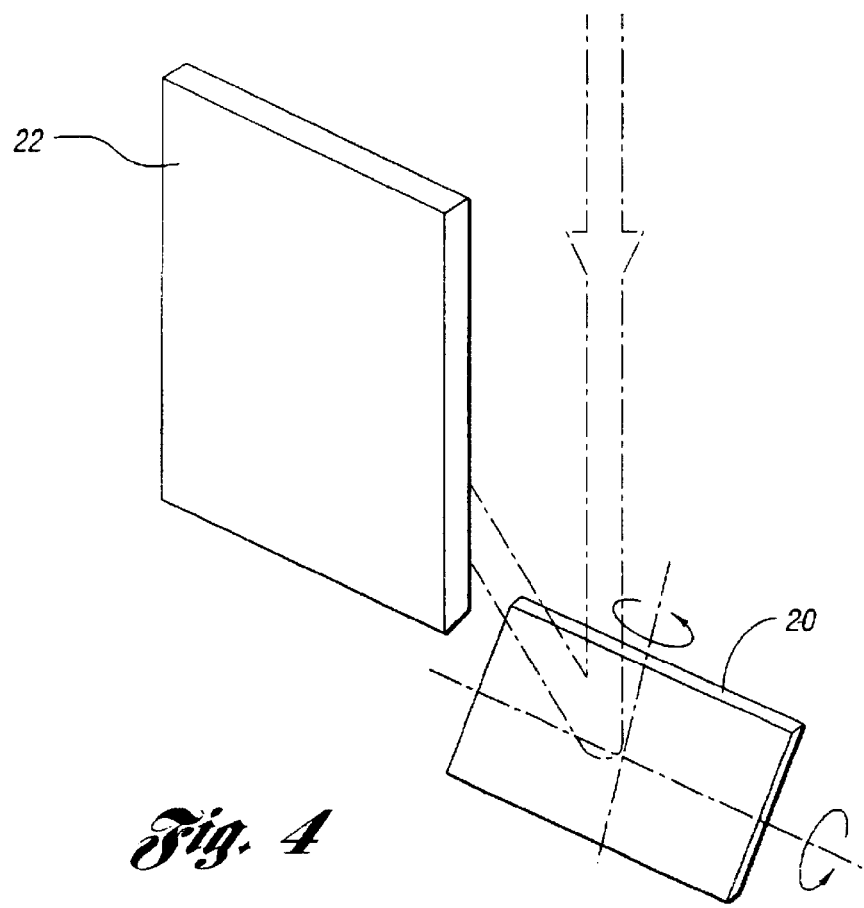
FIG. 4 illustrates the principle of operation of the windage and elevation adjustment mechanism of the present invention.

In order to use the holographic sight as a gun sight, a means must be provided to move the reticle pattern to coincide with the impact point of the bullet, that is, to zero the sight. To change the angular position of the reconstructed reticle image (windage and elevation adjustments), the grating 20 is rotated about the vertical and the horizontal axes to change the illumination beam angle as shown in FIG. 4.

Figure 5:
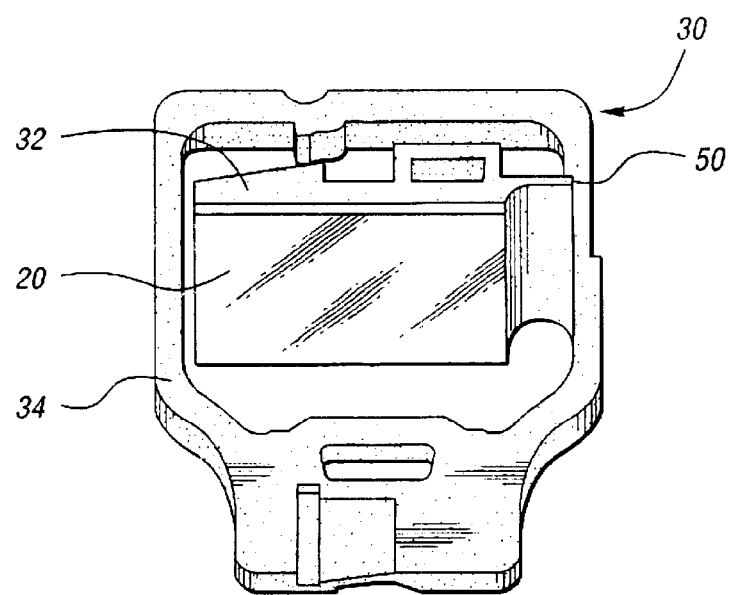
FIG. 5 is a partial plan view of the holographic grating mounted on a windage and elevation adjustment mechanism according to the present invention.
Figure 6:
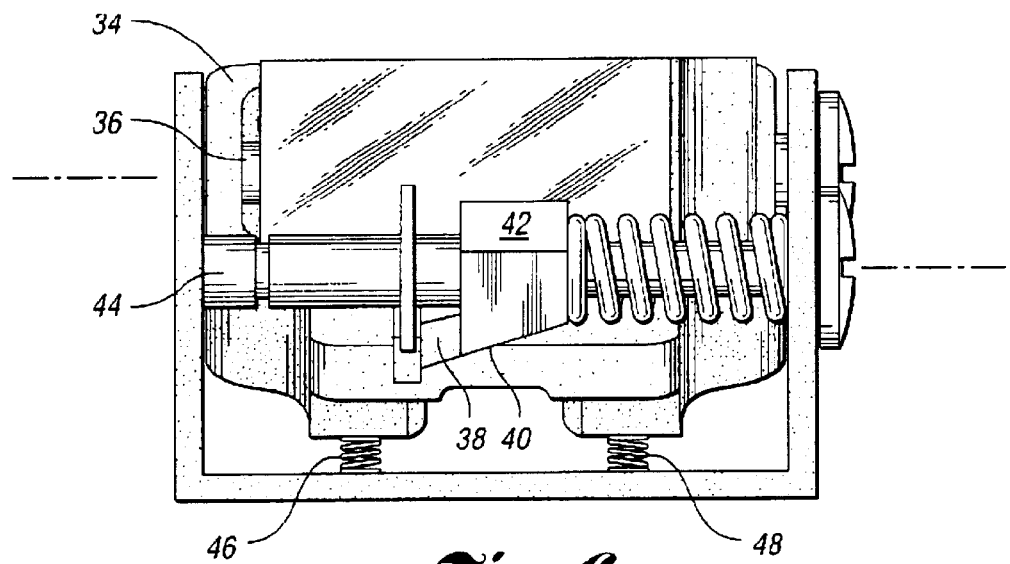
FIG. 6 is a partial end cross sectional view of the sight illustrating the components of the elevation adjustment mechanism.

The design of one embodiment of a very compact elevation and windage adjustment mechanism 30 is shown in FIGS. 5–9. The holographic grating 20 is mounted on the flexure arm 32 of a flex mount frame 34 as shown in FIG. 5. As shown in FIG. 6, elevation adjustment is achieved by rotating the frame assembly 34 about a pivot shaft 36 (which, in this embodiment is also the windage adjustment shaft) which lies along a horizontal axis. A very small angle of rotation is accomplished by forming an inclined plane 38 on the frame assembly 34 and riding it on the cylindrical surface 40 of a wedge nut 42. The nut 42 moves along a threaded elevation shaft 44 which is oriented parallel to the windage shaft 36. A spring load is applied, such as by, for example, springs 46, 48, to keep the wedge surface 38 of the flex mount pressed tightly against the wedge nut 42. Turning the elevation shaft 44 moves the nut 42 along the shaft 44 which moves the wedge surface of the flex mount up or down and, in turn, rotates the flex mount frame 34 about the windage shaft.

Figure 7:
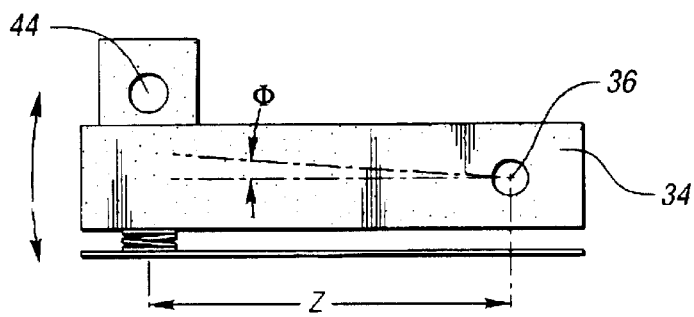
FIG. 7 illustrates the relationship between the pitch, wedge angle, lever arm and rotation sensitivity in the windage and elevation adjustment mechanism.
Figure 8:
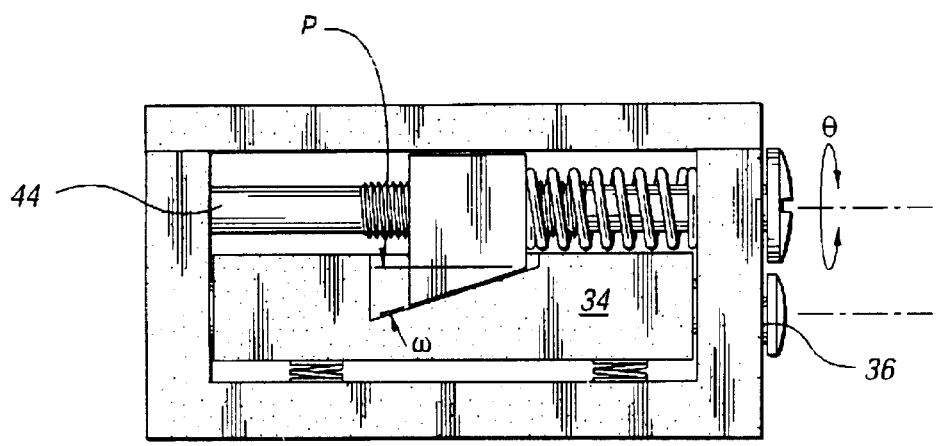
FIG. 8 is a partial cross sectional view illustrating the components of the windage adjustment mechanism.

As illustrated in FIGS. 7 and 8, the amount of rotation of the flex mount frame 34 produced by turning the threaded elevation shaft 44 is equal to:

$$\Phi = \arctan\left[\frac{\theta \times \tan\omega}{2 \times \pi \times P \times Z}\right]$$

where θ is the angle of rotation (in radians) of the elevation shaft, ω is the wedge incline plane angle, P is the thread pitch of the elevation shaft and Z is the distance between the wedge nut and the pivot shaft. The length of the lever arm Z is limited by packaging constraints. The desired sensitivity is achieved by using the appropriate incline plane angle s and thread pitch, P, of the shaft. For example, if Z=30 mm and we set ω=17.5° and P=80 threads per inch (3.15 threads per mm), the flex mount frame 34 will be rotated 11.5 m.o.a. about the w indage shaft 36 when the elevation shaft 44 is rotate d one complete revolution.

Figure 9:
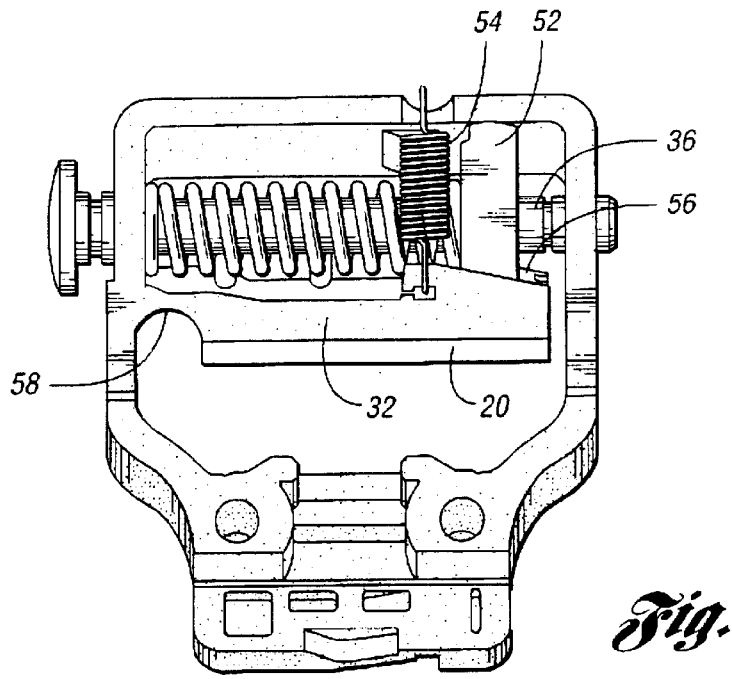
FIG. 9 is a cross sectional view of the fraction grating mount illustrating the windage adjustment mechanism.
Figure 10:
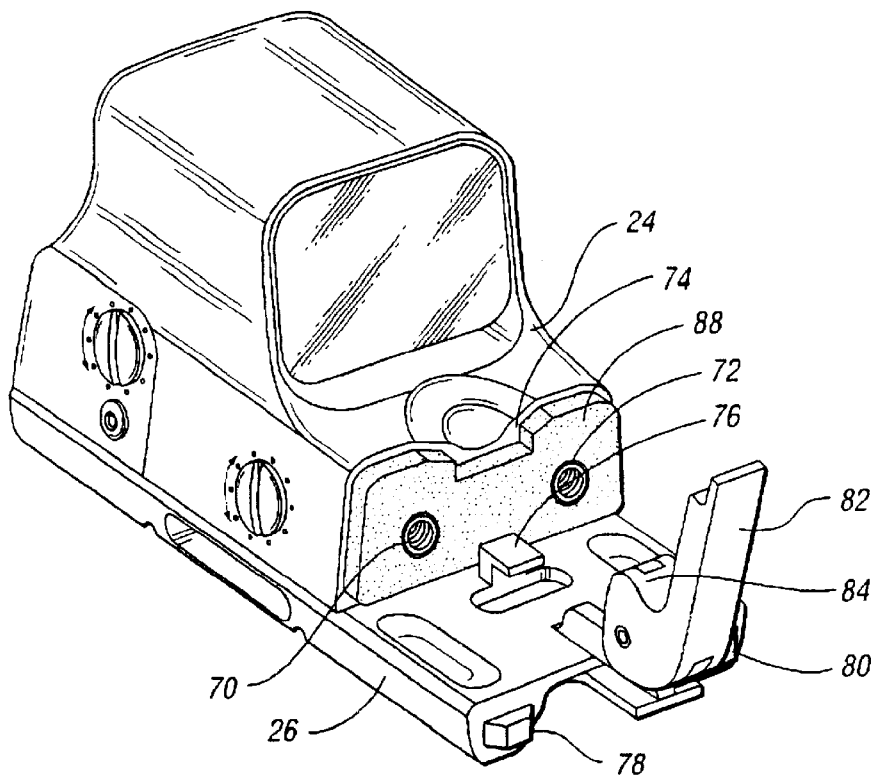
FIG. 10 is a perspective view of the sight with the battery compartment removed therefrom.

For windage adjustment, the grating is rotated about the fixed end 50 of the flexure arm 32 (shown in FIG. 5). It is accomplished in a similar manner as the elevation adjustment. The grating is rotated with the flexure arm 32. The free end of the flexure arm 32 rests on a nut 52 as shown in FIG. 9. A spring 54 pulls the inclined surface 56 on the flexure arm 32 tightly against the nut which moves along the windage shaft as the threaded shaft's rotated. The amount of rotation of the grating can be determined by the above equation. The lever arm, Z, is now the distance between the nut and the fixed end 58 of the flexure arm 32. For example, if Z=23 mm, P=80 threads per inch and ω=11.4°, the grating will be rotated 9.6 m.o.a. about the flexure when the windage shaft is rotated one complete revolution.

It should be noted from FIGS. 6–9 that, in one embodiment of the invention, the windage adjustment screw 36 performs the dual function of the elevation pivot shaft.

In one embodiment of the present invention, the power source for laser diode comprises one or more batteries. In a particular embodiment type "N" batteries are the power source. In another embodiment type "AA" batteries are the power source. It will, of course, be appreciated by those skilled in the art that any type of power source, preferably portable, and preferably small in size, may be utilized.

The compartment for the batteries in a gun sight must be able to hold the batteries securely under the strong recoil of a high caliber handgun. To make it easy for the user to change batteries in the field, it should not require the use of any tools to remove and replace the batteries. FIGS. 10–13 illustrate another aspect of the present invention, namely a battery holder compartment 60 that can be installed and removed without using any tools. In the illustrated embodiment, the battery compartment 60 is fabricated of a weather-resistant, resilient material, such as plastic, and is shaped to include recepticals 62, 64 for each of the batteries required to power the laser diode. When installed, the batteries 66, 68 extend slightly from the open end of the compartment 60, such that when the battery compartment is installed on the sight, terminals on each of the batteries 66, 68 make suitable contact with terminals 70, 72 located on the wall 74 of the housing.

The battery compartment 60 is preferably shaped such that it mates with the wall 74 of the housing Z4 and the base 26 when installed. One or more locator tabs, such as center tab 76 and end tabs 78, 80 are preferably provided on the housing and base, respectively, to align the battery compartment 60, by friction contact with alignment surfaces 75, 77, and 79, upon installation.

The base includes a lever arm 82 which is pivotally mounted on the base for rotation between an open position (shown in FIGS. 13a and 13b), and a closed position (shown in FIG. 13c). The lever arm includes cam surfaces 84 which contact a mating surface 86 on the battery compartment 60, and upon pivoting of the lever arm 82 from its open to closed position, urge the battery compartment 60 into a tight, locking fit against the housing and base of the sight.

A gasket 88, preferably consisting of rubber or another suitably flexible material, is preferably mounted on the mating surface of the wall 74 of the housing and the end 90 of the battery compartment, to provide seal against water, dust, and other contaminants. The cam action between the lever arm 82 locking mechanism and the surface of the compartment case can hold the batteries securely even under the repeated shock of recoil.

The batteries are placed inside the removable battery compartment. To install the batteries, the cam lever arm 82 is opened and the compartment is lowered onto the base of the sight. The cam lever is then closed, which pushes the battery compartment against the gasket to seal off the battery compartment from water and moisture. Closing of the cam also pushes the tabs 76, 78, and 80 on the housing 24 and the base 26 into the matching alignment surfaces 75, 77, and 79 in the battery compartment, holding the battery compartment securely onto the base. To remove the battery compartment, the cam is released and the battery compartment is pulled away from the tabs and lifted up and out.

Figure 14A:
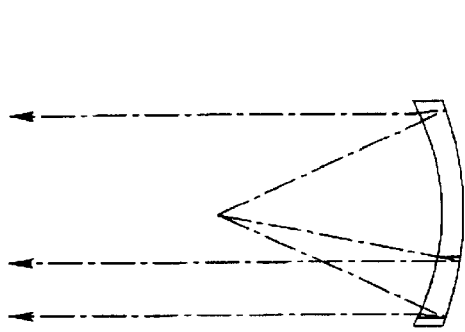
FIGS. 14a–b illustrate the method of design and fabrication of the off-axis collimator.
Figure 14B:
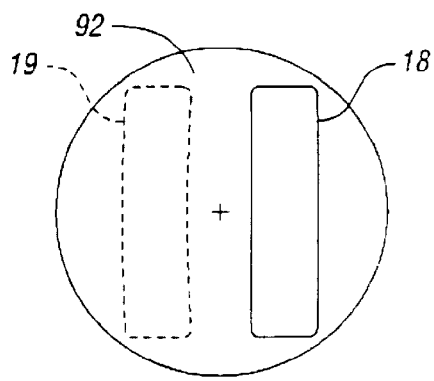

Ideally, an off-axis parabolic reflector should be used to collimate the laser beam. However, being aspheric, a parabolic reflector is expensive to fabricate. Thus, according to another aspect of the present invention, an off-axis collimator is implemented using two spherical surfaces. The radius of curvature of each of the spherical surfaces, their separation and the glass material are chosen to minimize spherical aberration. The rectangular off-axis collimator is obtained by fabricating a larger circular on-axis collimating lens 92 and cutting a piece off its side as shown in FIG. 14. The front surface is coated with a anti-reflection coating and the back surface is coated with a reflective coating, such as aluminum, into a mirror finish. The radii of each of the surfaces can be developed using known optical design methodologies, based upon desired focal length, the type of material, starting curvatures, separation of the reflactive and reflective surfaces, and the diameter of the lens 92. Commercially available computer software, such as Zemax Optical Design Program, available from Focus Software, Inc., of Tucson, Ariz., may be used for this purpose. It should be noted that two collimators 18, 19 may be fabricated from each lens 92 using this method.

Figure 15:
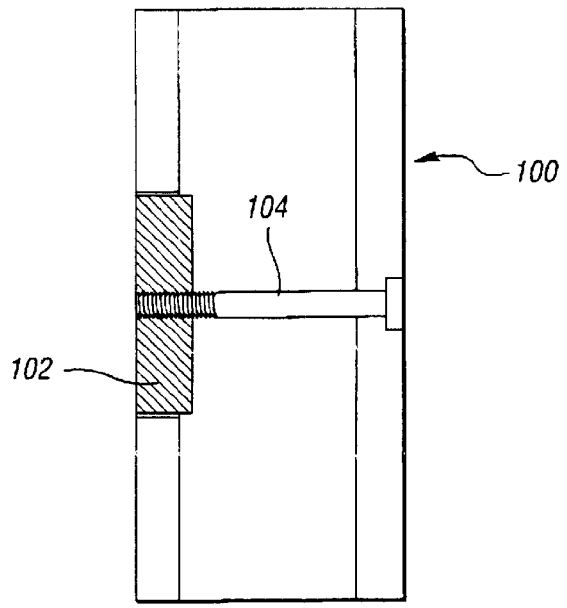
FIG. 15 is a bottom view of the base illustrating the mounting mechanism.
Figure 16:
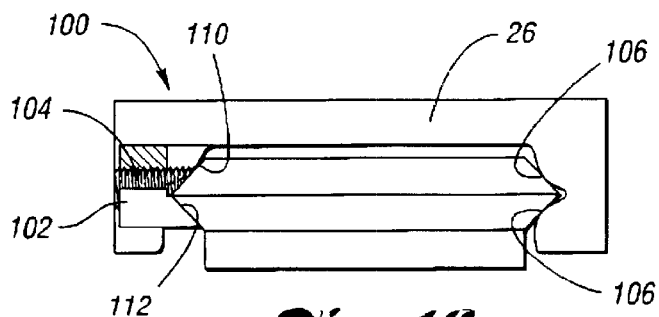
FIG. 16 is an end view of the base and mounting mechanism mounted on a Weaver® style dovetail rail.

Most mounting mechanisms for rifle scopes utilize two separate bolts. The holographic gun sight of the present invention is significantly shorter, however, which allows for use of the improved mounting mechanism illustrated in FIGS. 15 and 16. According to this aspect of the present invention, the base includes a mounting mechanism 100 having a clamp 102 and a single mounting bolt 104. The design of the mounting mechanism 100 for use with Weaver® style dovetail rail 105 also includes three radiused registration surfaces 106, 108, and 110 running parallel to and over substantially the entire length of the dovetail. Two of the radiused surfaces, 106 and 108, are on the opposite sides of the clamp 102 and hold onto the top and the bottom of the dovetail rail. The third radiused surface 110 is above the clamp which presses against the bottom of the dovetail. When tightened, the clamp is drawn in and the dovetail is pressed tightly against the curved contact surfaces. The combination of three fixed radiused registration surfaces and a floating fourth surface 112 on the clamp creates a clamping mechanism that can accommodate dovetail rails of slightly different widths. The line of surface contact along one side of the rail and the clamp at the other side form a stable triangle. The holographic gunsight can be dismounted and remounted without any change in the zero of the sight.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A holographic sight comprising:
   a base including a mounting mechanism;
   a housing, which together with the base, define a compartment containing,
      a laser diode emitting a light beam of visible wavelength, optical elements mounted within the compartment to direct the beam in a folded path within the compartment, wherein the path of the beam within the optical compartment is primarily substantially perpendicular to the path of the beam directed from the hologram to the target, the optical elements including,
      a hologram of a reticle pattern mounted in the path of the beam to project a reticle pattern to the target plane,
      a folding mirror mounted in the path of the beam to direct the beam from the laser diode on a path substantially perpendicular to the path to the target,
      a reflective off-axis collimator mounted in the path of the beam to collimate the beam and direct the beam from the folding mirror on a path also substantially perpendicular to the path to the target but in the opposite direction of the path of the beam between the folding mirror and the collimator, and
      a reflective diffraction grating mounted in the path of the collimated beam to diffract the beam and direct the beam from the collimator to the hologram on a path also substantially perpendicular to the path to the target but in the opposite direction of the path of the beam between the collimator and the diffraction grating; and
   a power source operably connected to the laser diode;
   wherein the reflective diffraction grating provides an adjustment mechanism for adjusting the path of the beam within the compartment to change the windage and elevation of the path of the beam directed from the hologram to the target.

2. The holographic sight of claim 1 wherein the adjustment mechanism comprises a frame upon which the diffraction grating is mounted for pivotal rotation about a first axis, and which frame is, in turn, mounted in the housing for pivotal rotation about a second axis orthogonal to the first axis.

3. The holographic sight of claim 2 wherein the collimator comprises a refractive material including a first spherical surface having a first radius of curvature and a second, reflective spherical surface having a second radius of curvature, and wherein the collimator is mounted in the path of the beam such that the beam first contacts the first spherical surface, is transmitted through the collimator onto the second spherical surface, and is reflected off of the second spherical surface and again through the collimator material.

4. The holographic sight of claim 3 wherein the refractive material is glass.

5. The holographic sight of claim 1 wherein the power source is at least one battery, and further including a removable battery compartment comprising battery compartment housing including a receptacle for each of the at least one batteries, a mating surface and at least one alignment surface, and wherein the sight includes a wall on the housing having, for each of the at least one batteries, a terminal suitable for electrical connection, and at least one alignment tab, and further including a lever arm having a cam surface, the lever arm being pivotally mounted on the base for movement between a closed position in which the cam surface of the lever arm contacts the mating surface on the battery compartment, urging the battery compartment into a tight fit against the housing and the base of the sight with the at least one alignment surface in contact with its corresponding alignment tab, and an open position in which the cam surface of the lever arm is moved out of contact with the battery compartment, thereby allowing the battery compartment to be slidably positioned out of contact with the tabs and off the sight to facilitate removal and replacement of the batteries within the battery compartment.

6. The holographic sight of claim 1 further including a mounting mechanism on the base of the sight, the mounting mechanism including first and second radiused registration surfaces suitable for alignment and contact with the upper and lower surfaces of one dovetail rail located on the device to which the sight is to be mounted, a third fixed radiused surface suitable to contact one of the upper or lower surfaces on the opposite side of the dovetail rail, and a slidably positionable clamp including a fourth radiused surface suitable to contact the other of the upper or lower surface of the other side of the dovetail rail, and a threaded fastener connecting the clamp to the base such that the clamp may be moved from an open position in which the fourth radiused surface of the clamp is not in contact with the dovetail rail, to a clamped position in which the fourth radiused surface contacts one side of the dovetail rail and urges the first, second and third radiused surfaces into friction fit with the dovetail rail.

7. A holographic sight comprising:
a base including a mounting mechanism;
a housing, which together with the base, define a compartment containing,
    a laser diode emitting a light beam of visible wavelength, optical elements including,
        a hologram of a reticle pattern mounted in the path of the beam to project a reticle pattern to a target plane,
        a collimator mounted in the path of the beam to collimate the beam and direct the beam from the laser diode, and
        a reflective diffraction grating mounted in the path of the collimated beam to diffract the beam and direct the diffracted beam to the hologram; and
an adjustment mechanism for adjusting the path of the beam within the compartment to change the windage and elevation of the path of the beam directed from the hologram to the target, the adjustment mechanism comprising a frame within which the diffraction grating is mounted, a first adjuster for rotating the frame about a first axis, and a second adjuster for rotating the frame about a second axis orthogonal to the first axis, whereby the reticle pattern can be adjusted for windage and elevation; and
a power source operably connected to the laser diode.

8. The holographic sight of claim 7 wherein the adjustment mechanism first adjuster for rotating the frame about the first axis includes a pivoting shaft upon which the frame is pivotally mounted at one end of the frame, and wherein the frame includes an inclined plane located on the end of the frame opposite the end upon which the frame is pivotally mounted, a threaded first adjustment shaft mounted parallel to the pivoting shaft and including a nut threadably mounted thereon, the nut including a cam surface which contacts the inclined plane on the frame and, as the nut is moved along the length of the first adjustment shaft upon rotation of the shaft, the cam surface moves along the inclined surface to rotate the frame, and wherein the frame further includes a flexure arm upon which the diffraction grating is mounted, which flexure arm is mounted at one end of the arm to one side of the frame such that the flexure arm may be flexed to pivot about an axis that is orthogonal to the axis of rotation of the pivoting shaft, and wherein the flexure arm includes a second inclined plane located on the end of the flexure arm opposite the end of the arm which is pivotally mounted to the frame, a second threaded adjustment shaft mounted parallel to the pivoting shaft and including a nut threadably mounted thereon, the nut including a cam surface which contacts the inclined plane on the flexure arm and, as the nut is moved along the length of the second adjustment shaft upon rotation of the shaft, the cam surface moves along the inclined surface to rotate the flexure arm, whereby the diffraction grating may be adjustably rotated about two orthogonal axes.

9. A holographic sight comprising:
base including a mounting mechanism;
a housing, which together with the base, define a compartment containing,
    a laser diode emitting a light beam of visible wavelength, and optical elements including,
        a hologram of a reticle pattern mounted in the path of the beam to project a reticle pattern to a target plane,
        a folding mirror mounted in the path of the beam to direct the beam from the laser diode,
        a reflective off-axis collimator mounted in the path of the beam to collimate the beam and direct the beam from the folding mirror, the collimator comprising a refractive material including a first spherical surface having a first radius of curvature and a second, reflective spherical surface having a second radius of curvature, and wherein the collimator is mounted in the path of the beam such that the beam first contacts the first spherical surface, is transmitted through the collimator onto the second spherical surface, and is reflected off of the second spherical surface and again through the collimator material, and
        a reflective diffraction grating mounted in the path of the collimated beam to diffract the beam and direct the beam from the collimator to the hologram; and
a power source operably connected to the laser diode.

10. A holographic sight comprising:
a base including a mounting mechanism;
a housing, which together with the base, define a compartment containing,
    a laser diode emitting a light beam of visible wavelength, and optical elements including,
        a hologram of a reticle pattern mounted in the path of the beam to project a reticle pattern to a target plane,
        a collimator mounted in the path of the beam to collimate the beam and direct the beam from the laser diode, and
        a reflective diffraction grating mounted in the path of the collimated beam to diffract the beam and direct the beam to the hologram; and
a power source operably connected to the laser diode, wherein the power source is mounted within a removable power source compartment removable battery compartment comprising a power source compartment housing including a receptacle for each of the at least one power sources, a mating surface and at least one alignment surface, and wherein the sight includes a wall on the housing having, for each of the at least one power sources, a terminal suitable for electrical connection of the power sources to the laser diode, and at least one alignment tab, and further including a lever arm having a cam surface, the lever arm being pivotally mounted on the base for movement between a closed position in which the cam surface of the lever arm contacts the mating surface on the power source compartment, urging the power source compartment into a tight fit against the housing and the base of the sight with the at least one alignment surface in contact with its corresponding alignment tab, and an open position in which the cam surface of the lever arm is moved out of contact with the power source compartment, thereby allowing the power source compartment to be slidably positioned out of contact with the tabs and off the sight to facilitate removal and replacement of the power sources within the compartment.

11. A holographic sight comprising:

a base including a mounting mechanism, the mounting mechanism including first and second radiused registration surfaces suitable for alignment and contact with the upper and lower surfaces of one dovetail rail located on the device to which the sight is to be mounted, a third fixed radiused surface suitable to contact one of the upper or lower surfaces on the opposite side of the dovetail rail, and a slidably positionable clamp including a fourth radiused surface suitable to contact the other of the upper or lower surface of the other side of the dovetail rail, and a threaded fastener connecting the clamp to the base such that the clamp may be moved from an open position in which the fourth radiused surface of the clamp is not in contact with the dovetail rail, to a clamped position in which the fourth radiused surface contacts one side of the dovetail rail and urges the first, second and third radiused surfaces into friction fit with the dovetail rail;

a housing, which together with the base, define a compartment containing, a laser diode emitting a light beam of visible wavelength, and optical elements including, a hologram of a reticle pattern mounted in the path of the beam to project a reticle pattern to a target plane, a collimator mounted in the path of the beam to collimate the beam and direct the beam from the laser diode, and a reflective diffraction grating mounted in the path of the collimated beam to diffract the beam and direct the diffracted to hologram; and a power source operably connected to the laser diode.

* * * * *